(12) United States Patent
Li

(10) Patent No.: US 6,547,420 B2
(45) Date of Patent: Apr. 15, 2003

(54) ILLUMINATING COMPUTER INPUT DEVICE

(75) Inventor: Zu-Nan Li, Taipei Hsien (TW)

(73) Assignee: Key Systems Corp., Taipei Hsien (TW)

( * ) Notice: Subject to any disclaimer, the term of this patent is extended or adjusted under 35 U.S.C. 154(b) by 0 days.

(21) Appl. No.: 09/992,792

(22) Filed: Nov. 19, 2001

(65) Prior Publication Data

US 2002/0105804 A1 Aug. 8, 2002

(30) Foreign Application Priority Data

Feb. 5, 2001 (CN) .......................... 01203534 U

(51) Int. Cl.$^7$ ............................................. F21V 33/00
(52) U.S. Cl. ...................... 362/253; 362/800; 345/157; 345/156
(58) Field of Search ................ 362/253, 812, 362/800, 540, 542, 545; 345/163, 164, 165, 167, 157, 158, 169, 176

(56) References Cited

U.S. PATENT DOCUMENTS 5,729,925 A * 3/1998 Prothero ........................ 40/570
6,030,088 A * 2/2000 Scheinberg .................... 362/85

* cited by examiner

Primary Examiner—Sandra O'Shea
Assistant Examiner—Ronald E. DelGizzi
(74) Attorney, Agent, or Firm—David A. Belasco; Belasco Jacobs & Townsley, LLP

(57) ABSTRACT

An illuminating computer input device includes a base, a housing and a light source mounted inside the housing, wherein the housing is transparent or translucent. An covering layer is applied on an outer surface or an inner surface of the housing. A patterned-window is further formed in the covering layer by removing a portion of the covering layer from the housing. By such arrangement, light generated by the light source is able to transmit out of the housing via the patterned-window so as to create an illuminating effect.

10 Claims, 6 Drawing Sheets

ILLUMINATING COMPUTER INPUT DEVICE

BACKGROUND OF THE INVENTIONS

1. Field of the Invention

The present invention relates to a computer input device, and more particularly to an illuminating computer input device that has an illuminating patterned-window on a housing of the input device.

2. Description of Related Art

A computer input device is a vital tool for a user to operate a computer. A typical computer input device includes a mouse, a keyboard, a joystick, a PC camera, a digital camera or a track ball. In accompaniment with the rapid growth of information technology all over the world, the related demands especially the demand of the computer input device also has grown rapidly. Therefore, to fulfill this demand, numerous kinds of computer input devices have continuously been invented, and one kind of the computer input device that has been recently very popular is an illuminating computer input device.

With reference to FIG. 10, a conventional illuminating computer input device (80) is shown and includes a housing (81), and a screen (82) mounted in a surface of the housing (81). The screen (82) is made of a transparent or a translucent material and formed with a pattern such as a picture, a letter, a logo or a combination of the above so that when a light source inside the computer input device (80) illuminates, the light it generates is able to pass through the screen (82) and scatters outside the computer input device (80). More particularly referring to FIG. 11, the screen (82) is mounted in the surface of the computer input device (80) by way of securely receiving the screen (82) in a corresponding socket (810) defined in the surface. A hole (811) is further defined through a bottom face defining the socket (810) to allow the light to pass therethrough.

However, the aforementioned computer input device has the following disadvantages:

1. High Cost

During the production of the computer input device (80), extra procedures have to be taken in order to form the socket (810) and the hole (811), and therefore increase the complexity of the production. Moreover, adding the screen (82) requires not only extra procedures but also consumes additional material. Accordingly, the time and cost associated with the production of the computer input device (80) are increased.

2. Poor Illuminating Effect

Due to that the size of the screen (82) is usually small, the illuminating effect it can provide is inherently limited.

Therefore, it is an objective of the invention to provide an improved illuminating computer input device to eliminate the aforementioned problems.

SUMMARY OF THE INVENTION

An objective of the present invention is to provide an illuminating computer input device that is able to create an improved illuminating effect. The illuminating computer input device includes a transparent/translucent housing, a light source mounted inside the housing, and a covering layer (opaque or semi-opaque) applied onto the housing. A portion of the covering layer is removed to form a patterned-window to allow light generated by the light source to pass through the patterned-window.

Another objective of the present invention is to provide an illuminating computer input device that is easy to manufacture such that the time and cost associated with the manufacturing of the illuminating computer input device are low.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
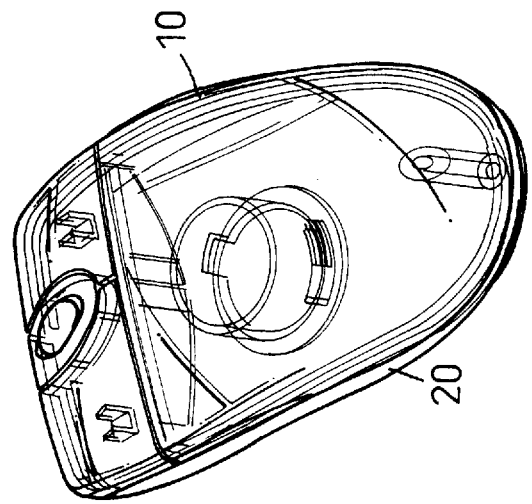
FIG. 1 is a perspective view of an illuminating computer input device after being formed by injection molding.
Figure 2:
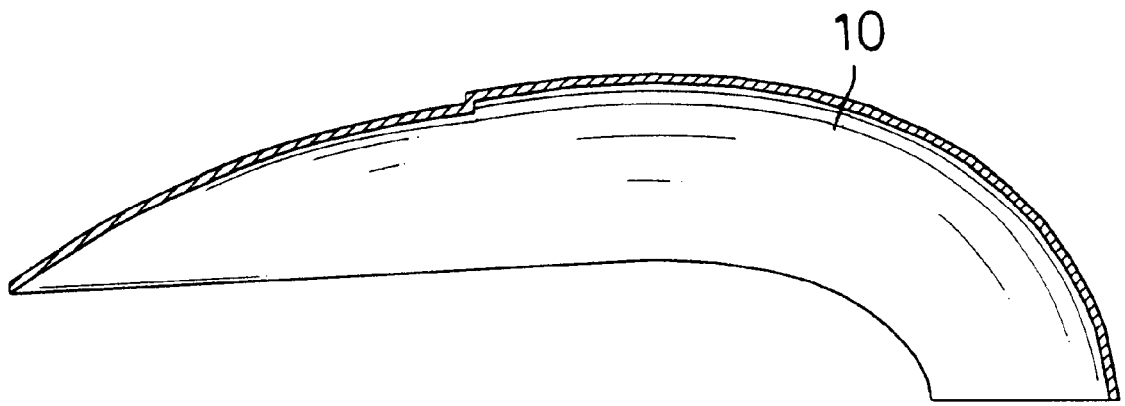
FIG. 2 is a cross-sectional, partial view of the computer input device in FIG. 1.

With reference to FIGS. 1 and 2, an illuminating computer input device in accordance with the present invention includes a housing (10) and a base (20), wherein at least one of the housing (10) and the base (20) is composed of a transparent or translucent material and typically formed by means of injection molding. It should be appreciated that description hereinafter is focused primarily on the housing (10), and the base (20) can easily be adapted as well in a similar manner by those persons skilled in the art. And the computer input device hereinafter means a computer mouse, trackball, game controllers, joy sticker, digital camera, or PC camera . . . etc.

Figure 3:
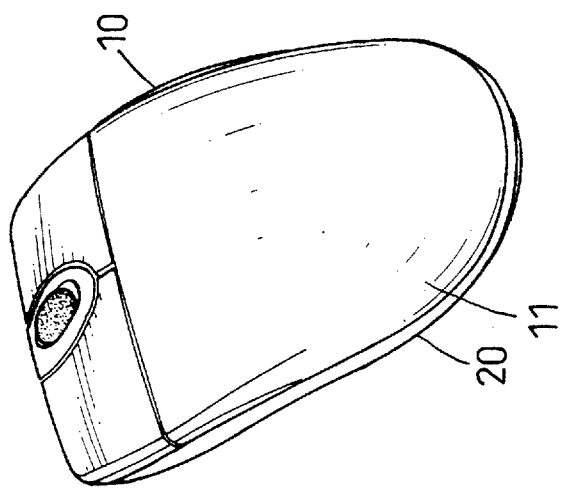
FIG. 3 is a perspective view of the computer input device after being painted.
Figure 4:
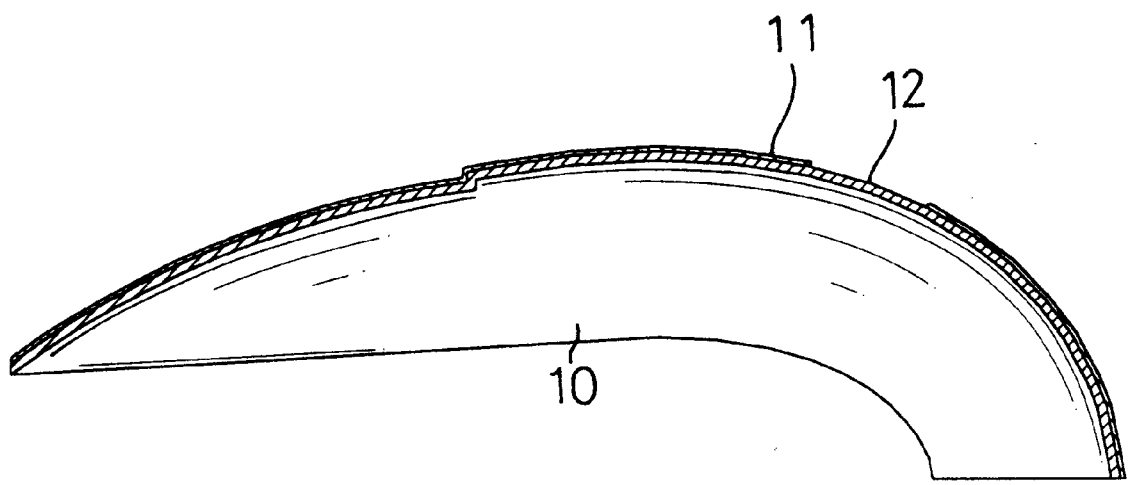
FIG. 4 is a cross-sectional, partial view of the computer input device in FIG. 3.
Figure 11:
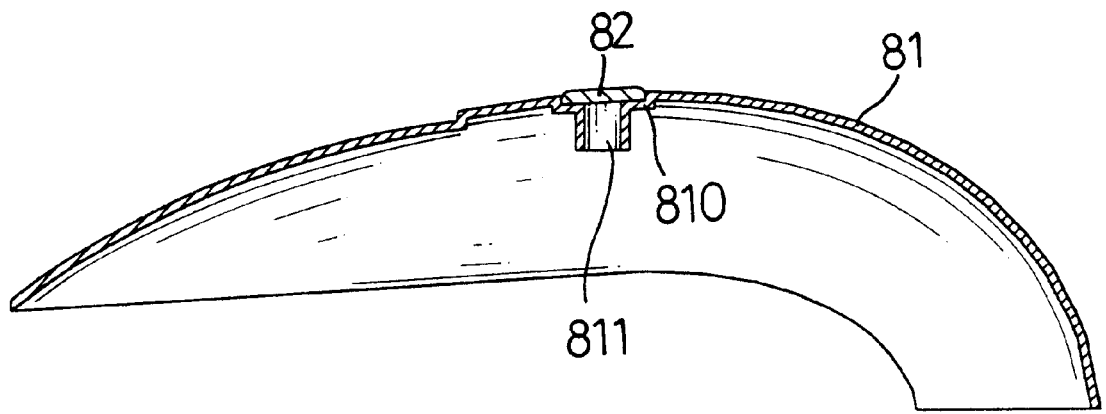
FIG. 11 is a cross-sectional, partial view of the conventional illuminating computer input device in FIG. 10.

With reference to FIGS. 3 and 4, the housing (10) being transparent or translucent is then applied with a covering layer (11) attached to an outer surface of the housing (10) by the known skill of spay painting or the like, and the covering layer (11) is opaque or semi-opaque to be applied to an appropriate thickness capable of blocking light fully or partially. However, the covering layer also can be selected form a variety of colors to create different visual effects, such as a dizzy or a contrary image.

Figure 5:
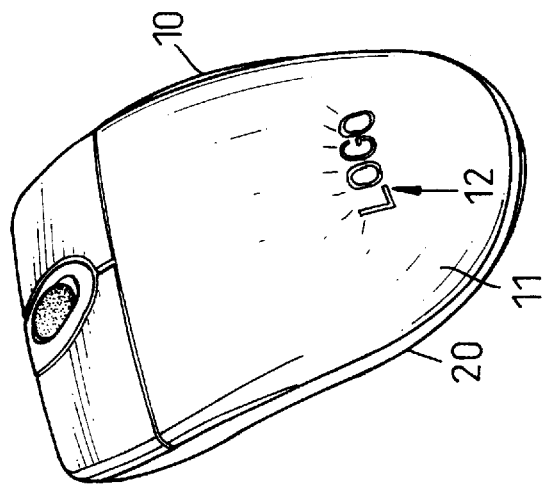
FIG. 5 is a perspective view of the computer input device formed with a transparent patterned-window.

With reference to FIGS. 4 and 5, a portion of the covering layer (11) is removed by laser carving or the like to form a desired patterned-window (12), such as words, logos, figures . . . onto the housing (10) so that light is allowed to transmit from the inside to the outside of the housing (10) via the patterned-window (12) without being blocked by the covering layer (11).

Figure 6:
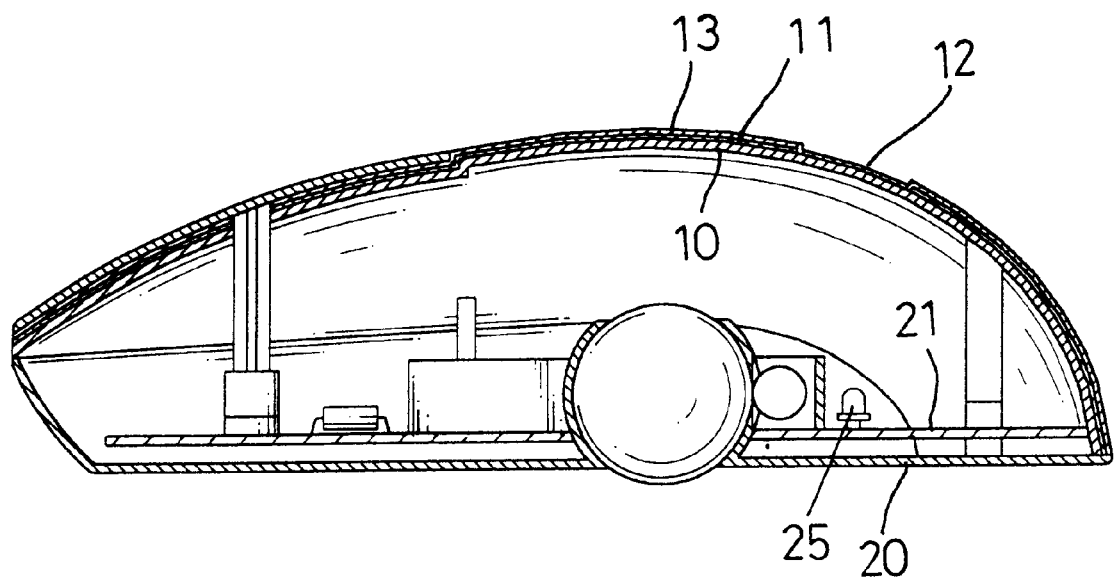
FIG. 6 is a cross-sectional, partial view of the computer input device in FIG. 5.

With reference to FIG. 6, the computer input device has a circuit board (21) mounted therein, and the circuit board (21) includes a light source (25) mounted thereon. Accordingly, when the light source (25) generates a light beam, the light beam can transmit through the patterned-window (12) and scatters outside the housing (10). It should be noted that if the computer input device is an optical type, the light source (25) is already exist as to detect the moving of the input device. And on the contrary, if it is a mechanical type, the light source (25) such as a light emitting diode (LED) should be additionally added to emit light in a desired color, and to match with the color of the covering layer 11. A transparent protecting layer 13 is further applied upon the covering layer 11 and/or the patterned-window 12 so as to increase the stereo visual effects, or to protect the various patterns thereon.

Figure 7:
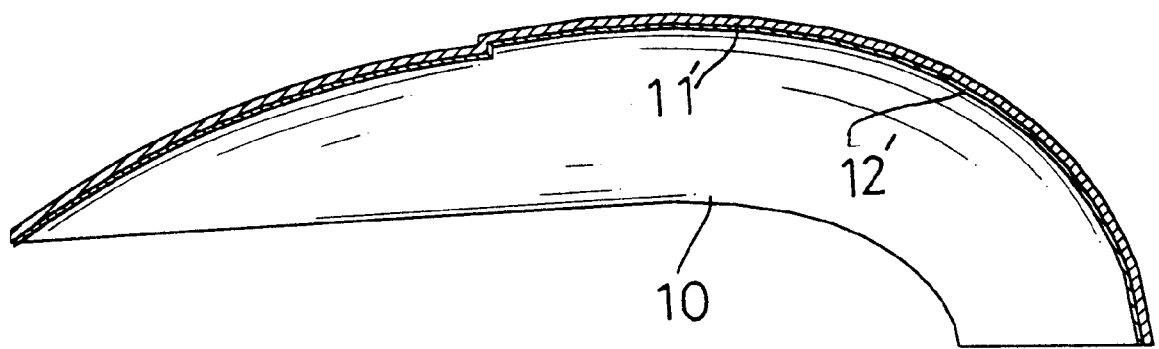
FIG. 7 is a cross-sectional, partial view of another preferred embodiment of the computer input device.

With reference to FIG. 7, another preferred embodiment is shown, wherein the housing (10) being transparent or translucent is then applied with an covering layer (11') attached to an inner surface of the housing (10), and the covering layer (11') is applied to an appropriate thickness capable of blocking light fully or partially. Also, a portion of the covering layer (11') is removed to form a desired patterned-window (12') onto the housing (10) so that light is allowed to transmit from the inside to the outside of the housing (10) via the patterned-window (12') with out being blocked by the covering layer (11'). Other components of the computer input device such as the base (20), the circuit board (21) and the light source (25) remain unchanged with the previous embodiment. However, it is noted that the covering layer (11') should be removed oppositely from the inner surface of the housing (10) so as to appear correct words or figures when viewed from outside of the housing (10).

Figure 8:
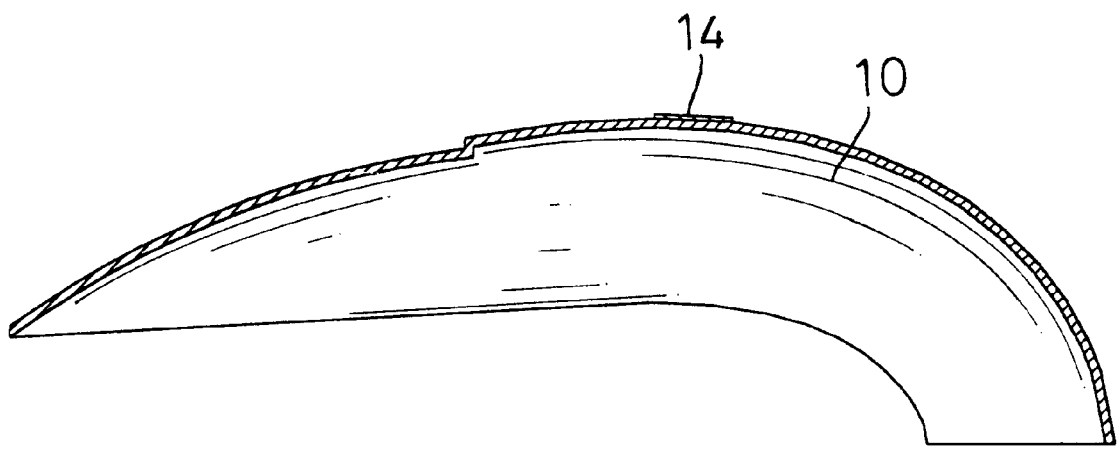
FIG. 8 is a cross-sectional, partial view of yet another preferred embodiment of the computer input device having a protecting sticker attached on an outer surface of a housing.
Figure 9:
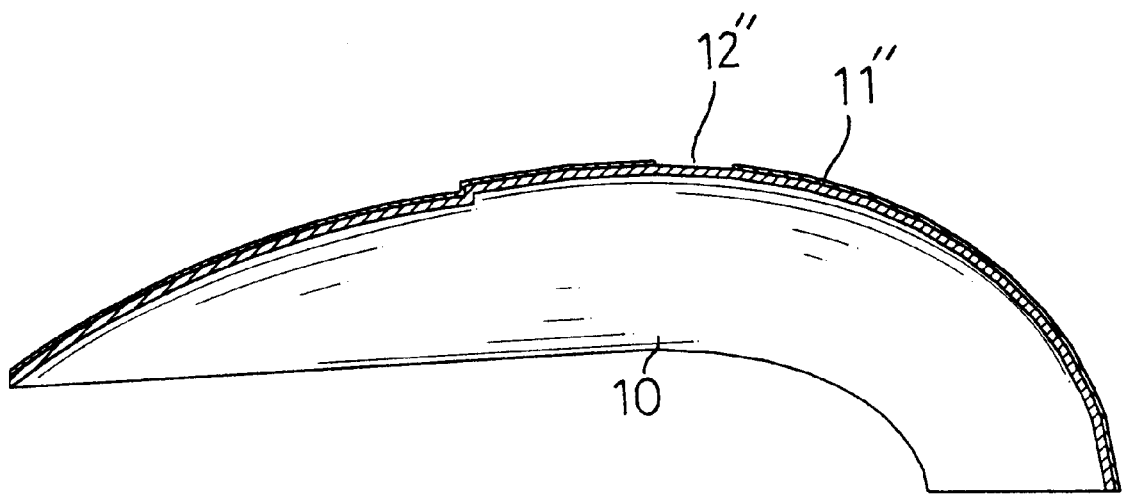
FIG. 9 is a cross-sectional, partial view of the preferred embodiment shown in FIG. 8 after the applying of a covering layer and removing the protecting sticker.
Figure 10:
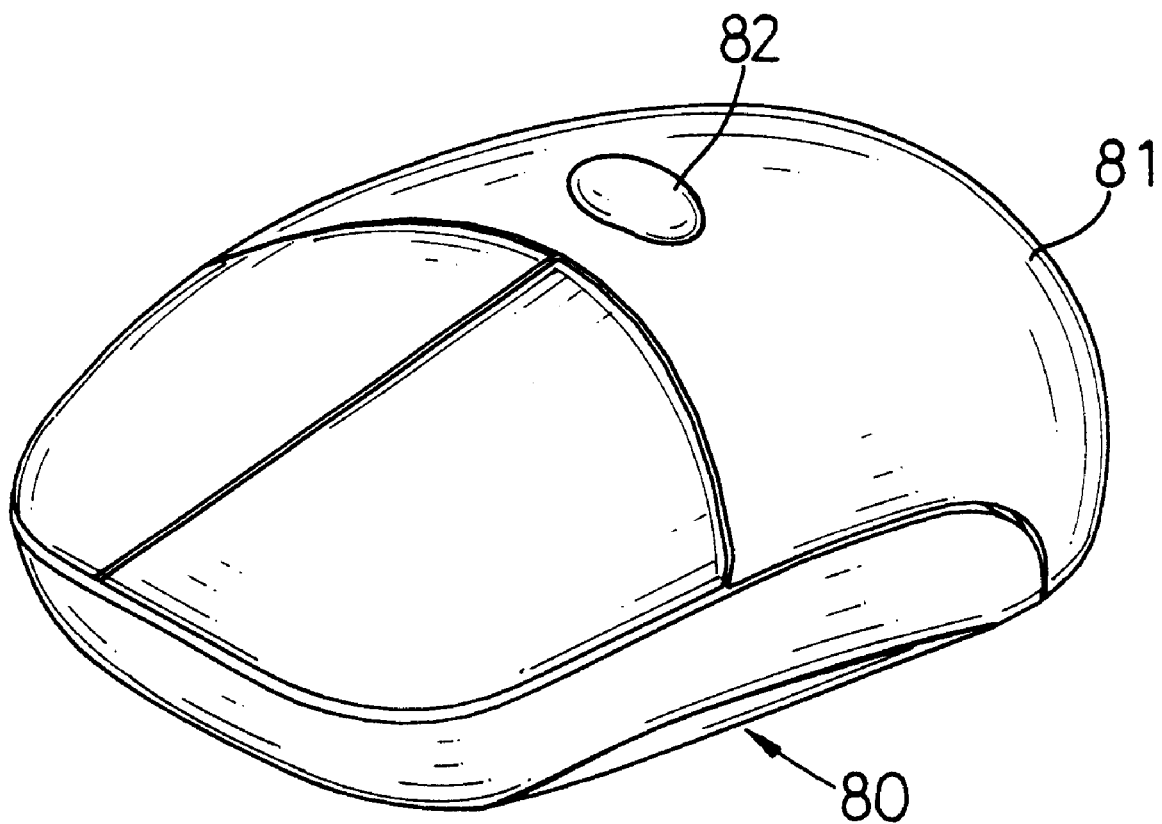
FIG. 10 is a perspective view of a conventional illuminating computer input device.

With reference to FIGS. 8 and 9, yet another preferred embodiment is shown, wherein the housing (10) is first attached with a sticker (14). The sticker (14) is shaped corresponding to a desired patterned-window (12") and removed after the outer surface of the housing is applied with a covering layer (11"). Consequently, the portion originally covered by the sticker (14) is not applied with the covering layer (11"), and forms the desired patterned-window (12"). However, the sticker 14 is a film selected from wax, plastic, and the like.

From the above description, it is noted that the invention has the following advantages:

1. Low Cost

The illuminating computer input device has a simple structure and is easy to manufacture. Therefore, the time and cost associated with the manufacturing of the computer input device are reduced if compared with a conventional illuminating computer input device.

2. Improved Illuminating Effect

The illuminating computer input device has the patterned-window (12) which can be formed much larger than a patterned-window of the conventional illuminating computer input device if desired, and thereby provides an improved illuminating effect because more light can pass through the larger patterned-window.

While this invention has been particularly shown and described with references to the preferred embodiment thereof, it will be understood by those skilled in the art that various changes in form and details may be made therein without departing from the scope of the invention encompassed by the appended claims.

What is claimed is:

1. An illuminating computer input device comprising:

a light pervious housing;

a light source mounted inside the light pervious housing;

a covering layer applied onto the light pervious housing;

the covering layer being either of opaque and semi-opaque;

a patterned window formed in the covering layer by removing a portion of the covering layer; and the light source emitting light passing through the patterned window.

2. The illuminating computer input device as claimed in claim 1, wherein the housing further has a film attached thereon, and the covering layer applied onto both the film and the housing that enables the light source to emit light passing through the patterned-window by removing the film.

3. The illuminating computer input device as claimed in claim 1, wherein the covering layer is applied on an outer surface of the housing.

4. The illuminating computer input device as claimed in claim 1, wherein the covering layer is applied on an inner surface of the housing.

5. The illuminating computer input device as claimed in claim 1, wherein the light source is a light emitting diode (LED).

6. The illuminating computer input device as claimed in claim 1, wherein a transparent protecting layer is further applied onto the covering layer or the patterned-window.

7. The illuminating computer input device as claimed in claim 1, wherein the housing is transparent.

8. The illuminating computer input device as claimed in claim 1, wherein the housing is translucent.

9. A method for emitting light from an input device, the steps comprising:

applying a covering layer onto a surface of a light pervious housing of the input device;

the covering layer being either of opaque and semi-opaque;

removing a portion of the covering layer on the surface to form a patterned window on the light pervious housing; and allowing a light source within the input device to emit light passing through the patterned window.

10. A method for emitting light from an input device, the steps comprising:

applying a covering layer onto both a surface of a light pervious housing of the input device and a film attached to the light pervious housing;

the covering layer being either of opaque and semi-opaque;

removing the film together with the covering layer that is applied on the film from the light pervious housing to form a patterned window on the housing; and allowing a light source within the input device to emit light passing through the patterned window.

* * * * *

UNITED STATES PATENT AND TRADEMARK OFFICE
CERTIFICATE OF CORRECTION

PATENT NO.    : 6,547,420 B2  Page 1 of 1
DATED         : May 12, 2003
INVENTOR(S)   : Zu-Nan Li It is certified that error appears in the above-identified patent and that said Letters Patent is hereby corrected as shown below:

<u>Title page,</u>
Item [73], the assignee name shown as "Key Systems Corp., Taipei Hsien (TW)" should be changed to -- Kye Systems Corp., Taipei Hsien (TW) --.

Signed and Sealed this

Twenty-sixth Day of August, 2003

JAMES E. ROGAN
*Director of the United States Patent and Trademark Office*